United States Patent
Kuo et al.

(10) Patent No.: US 8,994,330 B2
(45) Date of Patent: Mar. 31, 2015

(54) OUTLET ASSEMBLY WITH PORTABLE CHARGER

(75) Inventors: Ming-Chou Kuo, Taipei (TW); Yu-Lung Lee, Taipei (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 403 days.

(21) Appl. No.: 12/888,577

(22) Filed: Sep. 23, 2010

(65) Prior Publication Data

US 2012/0019207 A1 Jan. 26, 2012

(30) Foreign Application Priority Data

Jul. 21, 2010 (TW) .............................. 99124014 A

(51) Int. Cl.
*H02J 7/00* (2006.01)
*H01R 25/00* (2006.01)

(52) U.S. Cl.
CPC ............ *H02J 7/0042* (2013.01); *H01R 25/003* (2013.01); *H02J 7/0054* (2013.01)
USPC ....................................................... 320/111

(58) Field of Classification Search
USPC ....................................................... 320/111
See application file for complete search history.

(56) References Cited

U.S. PATENT DOCUMENTS

| | | | |
|---|---|---|---|
| 5,720,628 A * | 2/1998 | Usui et al. ...................... | 439/502 |
| 7,518,265 B2 * | 4/2009 | Roepke .......................... | 307/64 |
| 2003/0230934 A1 * | 12/2003 | Cordelli et al. ................ | 307/43 |
| 2007/0273325 A1 * | 11/2007 | Krieger et al. ................ | 320/106 |
| 2009/0195970 A1 * | 8/2009 | Lee et al. ...................... | 361/601 |

FOREIGN PATENT DOCUMENTS

| | | |
|---|---|---|
| CN | 2665988 Y | 12/2004 |
| CN | 2886899 Y | 4/2007 |
| CN | 200997427 Y | 12/2007 |
| CN | 201252411 Y | 6/2009 |

* cited by examiner

*Primary Examiner* — Drew A Dunn
*Assistant Examiner* — Robert Grant
(74) *Attorney, Agent, or Firm* — Rosenberg, Klein & Lee

(57) ABSTRACT

An outlet assembly with a portable charger including a power strip and a portable charger is disclosed. The power strip has a main body and a first power output interface. The main body has at least one power socket, and the first power output interface is located on the main body for supplying an AC power. The portable charger includes a power input interface and a second power output interface located on a casing. An AC to DC converting circuit and a power storage unit are located inside the casing. The power input interface may be fitted to the first power output interface, and the AC to DC converting circuit converts the AC power into DC to recharge the power storage unit. The portable charger may be used independently to provide the from the power storage unit through the second power output interface.

14 Claims, 6 Drawing Sheets

OUTLET ASSEMBLY WITH PORTABLE CHARGER

BACKGROUND OF THE INVENTION

1. Field of the Invention

The instant disclosure relates to an outlet assembly with portable charger; in particular, to an outlet assembly with a removable portable charger.

2. Description of the Related Art

When going out or traveling, people are carrying more electronic devices nowadays. Accordingly, one or more rechargeable batteries are often carried to prevent the electronic devices from going out of power. However, people may forget to recharge or misplace the rechargeable batteries. In other cases, the rechargeable batteries may be due for recharging, but the charger is not readily available to the user.

SUMMARY OF THE INVENTION

The object of the instant disclosure is to provide an outlet assembly with a portable charger. For convenience, the portable charger can be carried by the user to recharge electronic devices. In addition, to find the charger quickly, the portable charger can fit with the power strip as one unit, since most people remember the power strip location more vividly.

To achieve the above object, the instant disclosure provides an outlet assembly with a portable charger, which includes a power strip and a portable charger. The portable charger may be recharged by fitting to the power strip. Upon recharging, the portable charger is used independently to charge other electronic devices.

The said power strip comprises a main body and a first power output interface, with the first power output interface located on the main body supplying AC power.

The said portable charger comprises a casing, a power input interface, an AC to DC converting circuit, a power storage unit, and a second power output interface. The power input interface and the second power output interface are located on the casing, while the AC to DC converting circuit and the power storage unit are located inside the casing. The power input interface may be connected to the first power output interface.

When the power input interface is connected to the first power output interface, the AC to DC converting circuit is configured to convert the power supply from AC to DC for recharging the power storage unit.

When the power input interface is disconnected from the first power output interface, the power storage unit provides a power supply through the second power output interface.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTIONS OF THE PREFERRED EMBODIMENTS

Figure 1A:
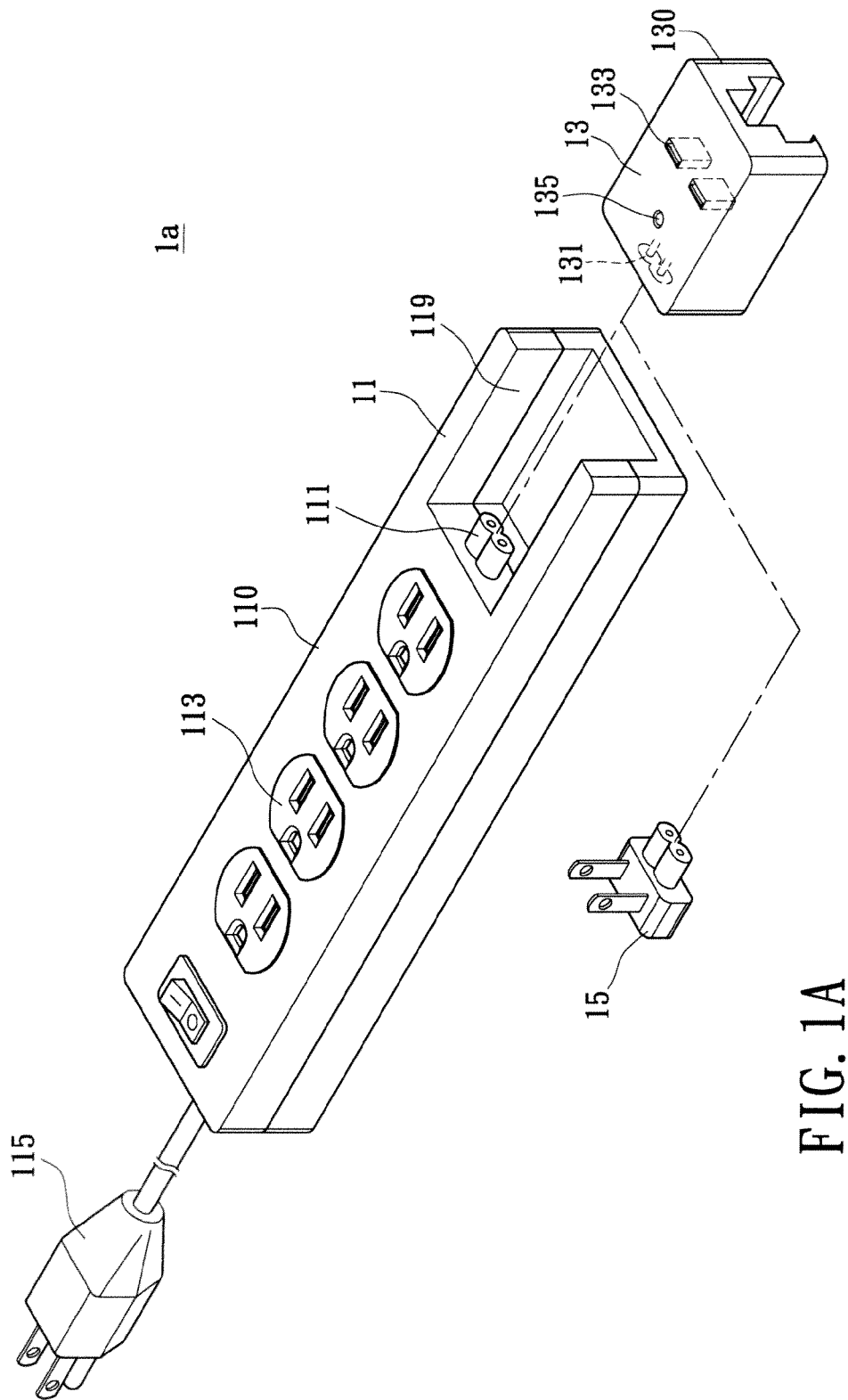
FIG. 1A shows a schematic view of an outlet assembly with a portable charger according to a first embodiment of the instant disclosure.

FIG. 1A shows a schematic view of an outlet assembly with a portable charger according to a first embodiment of the instant disclosure. As shown in FIG. 1A, an outlet assembly 1a includes a power strip 11 and a portable charger 13. The portable charger 13 may fit to the power strip 11.

The portable charger 13 of the outlet assembly 1a has an internal rechargeable battery. When the power strip 11 is plugged to a line power (AC), the portable charger 13 is recharged by fitting to the power strip 11. The portable charger 13 may be detached from the power strip to serve as an independent power source for at least one electronic device.

In the present embodiment, the power strip 11 may be fixed on a wall or equipped with an extension cord. For example, FIG. 1A shows a power strip 11 having an extension cord. The power strip 11 includes a main body 110, a first power input interface 115, a first power output interface 111, and a plurality of second power output interfaces 113. Meanwhile, the portable charger 13 comprises a casing 130, a second power input interface 131, a third power output interface 133, and an indicator 135.

The first power input interface 115, such as a power plug, is connected to a line power (AC). The first power input interface 115 is then connected to the main body 110 by a power cord. The first power output interface 111 and the second power output interfaces 113 are located on the main body 110. The first power output interface 111 of the power strip 11 may correspond to the second power input interface 131 of the portable charger 13. In one implementation, the first power output interface 111 may be a C6 connector while the second power input interface may be a C8 connector wherein C6 and C8 connectors are in compliance with corresponding specifications proposed by International Electro-technical Commission (IEC). The second power output interface 113 may be either a Type A socket with two holes or a Type B socket with three holes. The third power output interface 133 may be located on the portable charger 13 and may be an USB type connector, such as a USB 2.0 or USB Mini, or any other DC power output connector, to provide power connection to the electronic devices.

To ensure secure connection when the portable charger 13 fits to the power strip 11, the main body 110 of the power strip 11 further includes a receiving portion 119. The receiving portion 119 may be shaped to accommodate the portable charger 13 firmly. The first power output interface 111 is located inside the receiving portion 119 and when the portable charger 13 is accommodated within the receiving portion 119 the first power output interface 111 may establish an electrical connection with the second power input interface 131.

As shown in FIG. 1A, the second power input interface 131 of the portable charger 13 may further be connected to an external AC power plug 15. The external AC power plug 15 allows for the portable charger 13 to be recharged directly by being plugged into any power socket, which enhances the portable charger 13 adaptability.

The external AC power plug 15 may be magnetically connected to, slotted into, or in any commercially available manner accommodated within the casing 130 of the portable charger 13.

When the portable charger 13 is detached from the power strip 11, the portable charger 13 may be in connection with the electronic device through the third power output interface 133 so that the electric power stored within the portable charger 13 may be utilized by the electronic device. Thus, the portable charger 13 may serve as a reliable power source on several occasions without being limited by locations of the portable charger 13 and specifications of the electronic device.

Located on the casing 130, the indicator 135 is used to indicate a power level within the portable charger 13. The indicator 135 may be a light emitting diode (LED) or a plurality of LEDs, which may employ different light colors to indicate different power levels whether the portable charger 13 is recharged or charges the electronic device. Alternatively, different flashing frequencies or brightness of the same light color may also be used to indicate the power level.

Figure 1B:
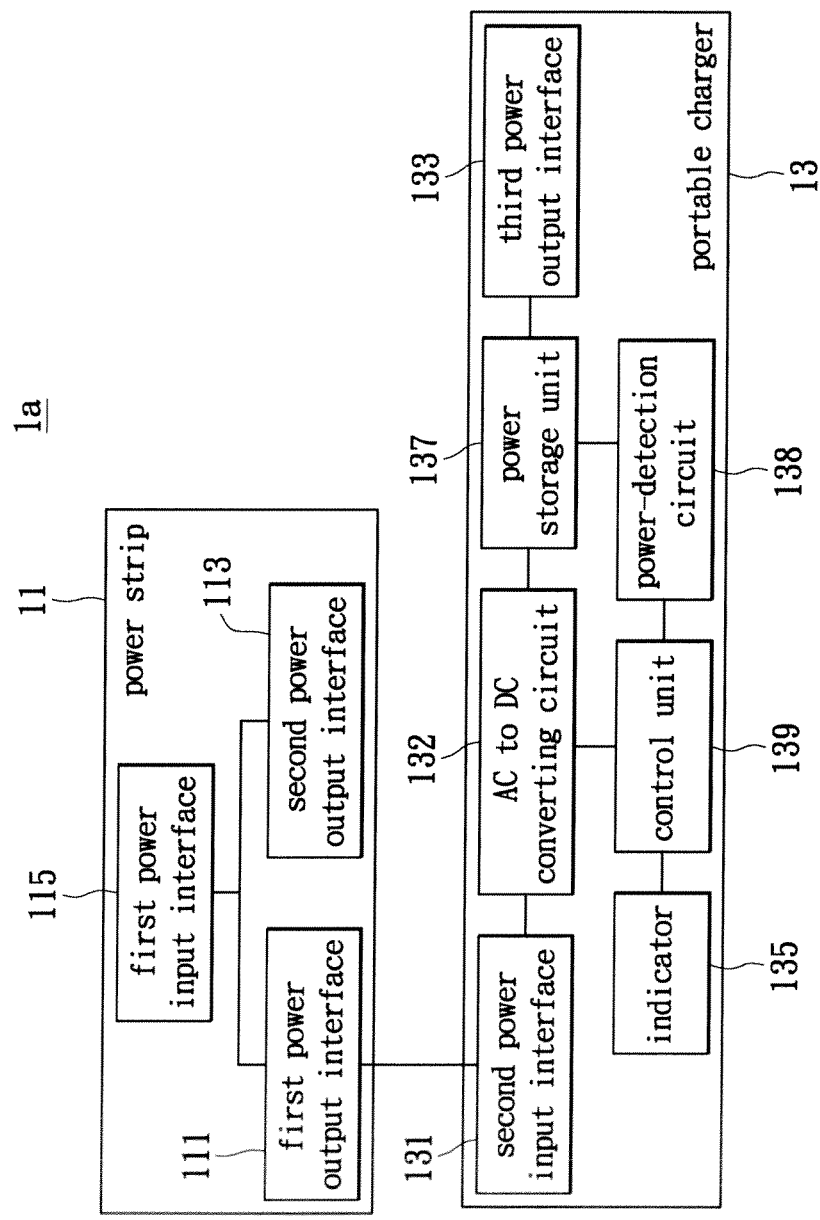
FIG. 1B shows a block diagram of an outlet assembly with a portable charger according to a first embodiment of the instant disclosure.

Next, please refer to FIG. 1B, which shows a block diagram illustrating the operating principles of the outlet assembly 1a according to the first embodiment. As shown in FIG. 1B, the first power input interface 115 is electrically connected to the first power output interface 111 and the second power output interface 113. The portable charger 13 receives the AC power when the second power input interface 131 is connected to the first power output interface 111. Inside the casing 130, the portable charger 13 has an AC to DC converting circuit 132, a power storage unit 137, a power-detection circuit 138, and a control unit 139.

As shown in FIG. 1B, the AC to DC converting circuit 132 is electrically connected to the second power input interface 131 and the power storage unit 137. The third power output interface 133 is electrically connected to the power storage unit 137. The power-detection circuit 138 is electrically connected to the power storage unit 137. The control unit 139 is electrically connected to the AC to DC converting circuit 132, the power-detection circuit 138, and the indicator 135.

The second power input interface 131 receives the AC power. The AC to DC converting circuit 132 filters, rectifies, regulates, and converts the AC power into its DC counterpart. A DC power is delivered to the power storage unit 137. When the portable charger 13 is detached from the power strip 11, the power storage unit 137 may release the DC power through the third power output interface 133.

The power-detection circuit 138 detects the voltage, current, and power of the power storage unit 137. An outcome of the detection in terms of a detection signal is sent to the control unit 139, which operates the indicator 135. Thereby, a human operator may be alerted if the charger 13 is low in the power level or how long the charger 13 is from being fully recharged. In addition, the portable charger 13 can further include a buzzer (not shown). Based on the detection signal, the control unit 139 may sound the buzzer to inform the user of the charger 13 is low in the power level or the charger 13 has been fully recharged.

Also, the power-detection circuit 138 detects a temperature of the power storage unit 137. When the temperature of the power storage unit 137 goes above a predetermined threshold, the control unit 139 may turn on the indicator 135 or sound the buzzer to alert the user. Hence, the power storage unit 137 can be prevented from overheat.

The control unit 139 also controls whether any output could be from the AC to DC converting circuit 132 to the power storage unit 137. More specifically, the control unit 139 compares the power level of the power storage unit 137 and a power level of the AC to DC converting circuit 132 to. When both power levels are equal, the control unit 139 is configured to stop the AC to DC converting circuit 132 from continuously charging the power storage unit 137. If the power level of the power storage unit 137 is smaller than that of the AC to Dc converting circuit 132, the AC to DC converting circuit 132 is configured to recharge the power storage unit 137. Thereby, the power storage unit 137 may be prevented from being overcharged to prolong a service life of the portable charger 13.

Figure 2A:
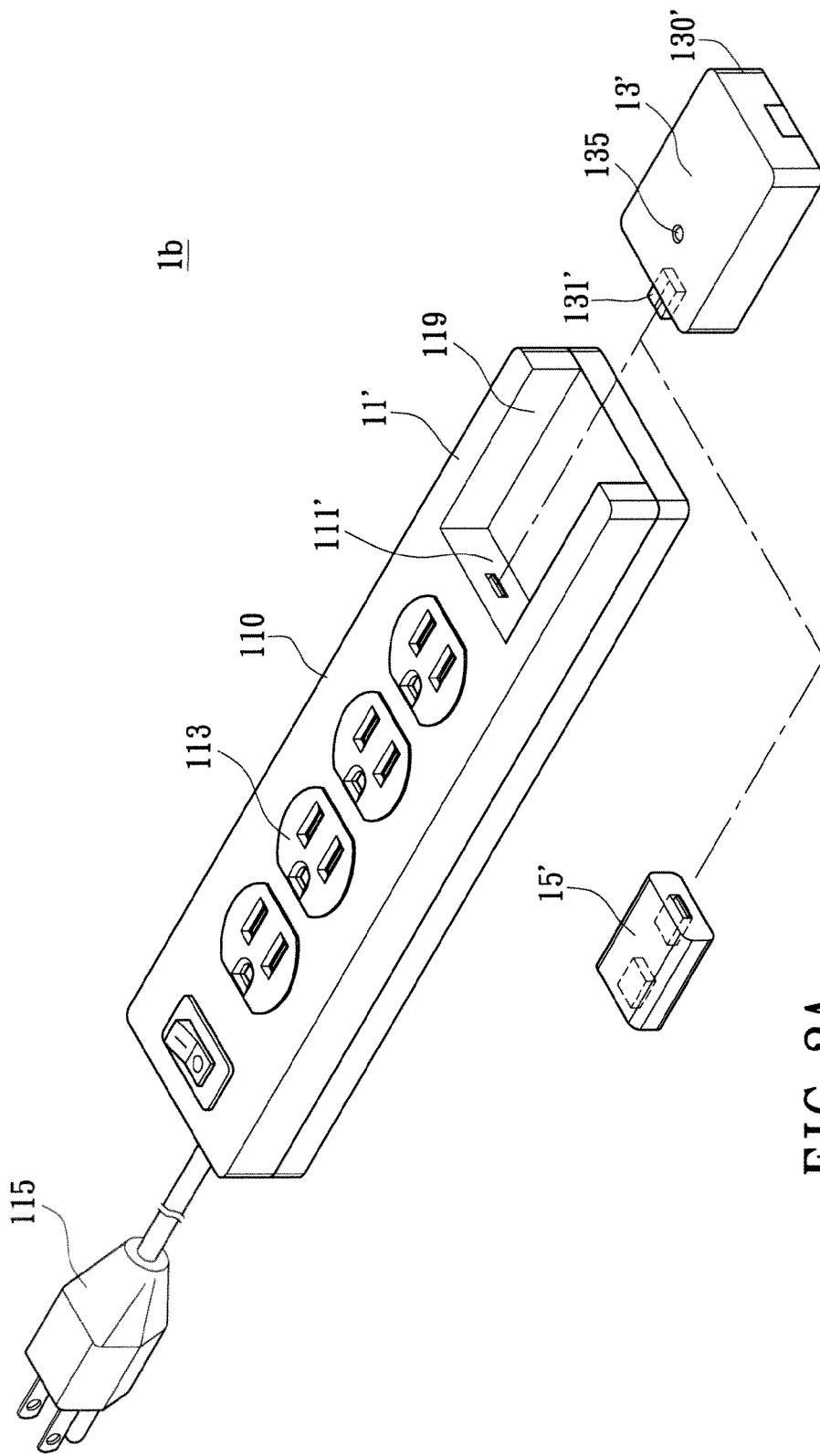
FIG. 2A shows a schematic view of an outlet assembly with a portable charger according to a second embodiment of the instant disclosure.

FIG. 2A shows a schematic view of an outlet assembly with a portable charger according to a second embodiment of the instant disclosure. The outlet assembly 1b is similar to the outlet assembly 1a of the first embodiment. One of the differences is the power strip 11' supplies both the AC and the DC power wherein the first power output interface 111' supplies the DC power, while the second power output interface 113 supplies the AC power. The power strip 11' uses the first power output interface 111' to provide the DC power directly to a portable charger 13', and the portable charger 13' has a power transfer interface 131' for recharging or charging other electronic devices.

When the power transfer interface 131' is fitted to the first power output interface 111', the portable charger 13' is recharged by the DC power through the power strip 11'. When the portable charger 13' is separated from the power strip 11', the power transfer interface 131' may be fitted to an external DC power connector 15'. A power cord of the electronic device may then be connected to the external DC power connector 15' so that the power stored within the portable charger 13' may be delivered to the electronic device.

In the present embodiment, the first power output interface 111' and the power transfer interface 131' may be USB or Mini USB-based connectors. For enabling connections to the electronic device and the portable charger 13', the external DC power connector 15' has two power transfer interfaces that correspond to the power transfer interface 131'.

Figure 2B:
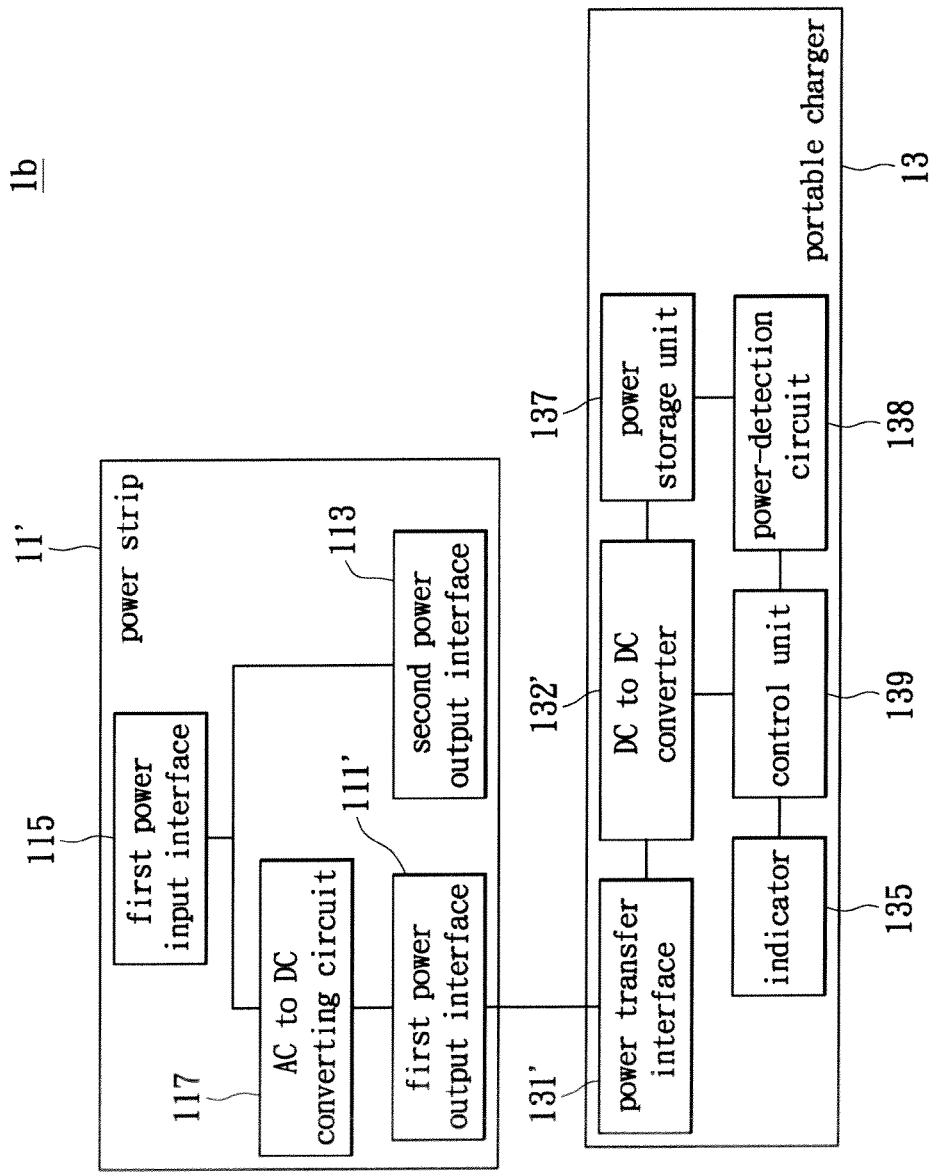
FIG. 2B shows a block diagram of an outlet assembly with a portable charger according to a second embodiment of the instant disclosure.

Next, the FIG. 2B shows a block diagram of an outlet assembly with a portable charger according to the second embodiment of the instant disclosure. As shown in FIG. 2B, the power strip 11' differs from the power strip 11 of the first embodiment by having an AC to DC converting circuit 117. The AC to DC converting circuit 117 is electrically connected to the first power input interface 115 and the first power output interface 111'. The portable charger 13' includes a DC to DC converter 132', which is electrically connected to the power transfer interface 131' and the power storage unit 137.

In the second embodiment, the control unit 139 not only operates the indicator 135 but also determine power levels at two ends of the DC to DC converter 132' before controlling whether the DC to DC converter 132' may charge the power storage unit 137. More specifically, the control unit 139 determines that the power transfer interface 131' receives the DC power from the first power output interface 111' the control unit 139 causes the DC to DC converter 132' to charge and the power storage unit 137. When the power transfer interface 131' is detached from the first power output interface 111', the power transfer interface 131' may connect to the electronic device through the external DC power connector 15' and the DC to DC converter 132' may provide the power stored within the power storage unit 137 with the electronic device.

Figure 3A:
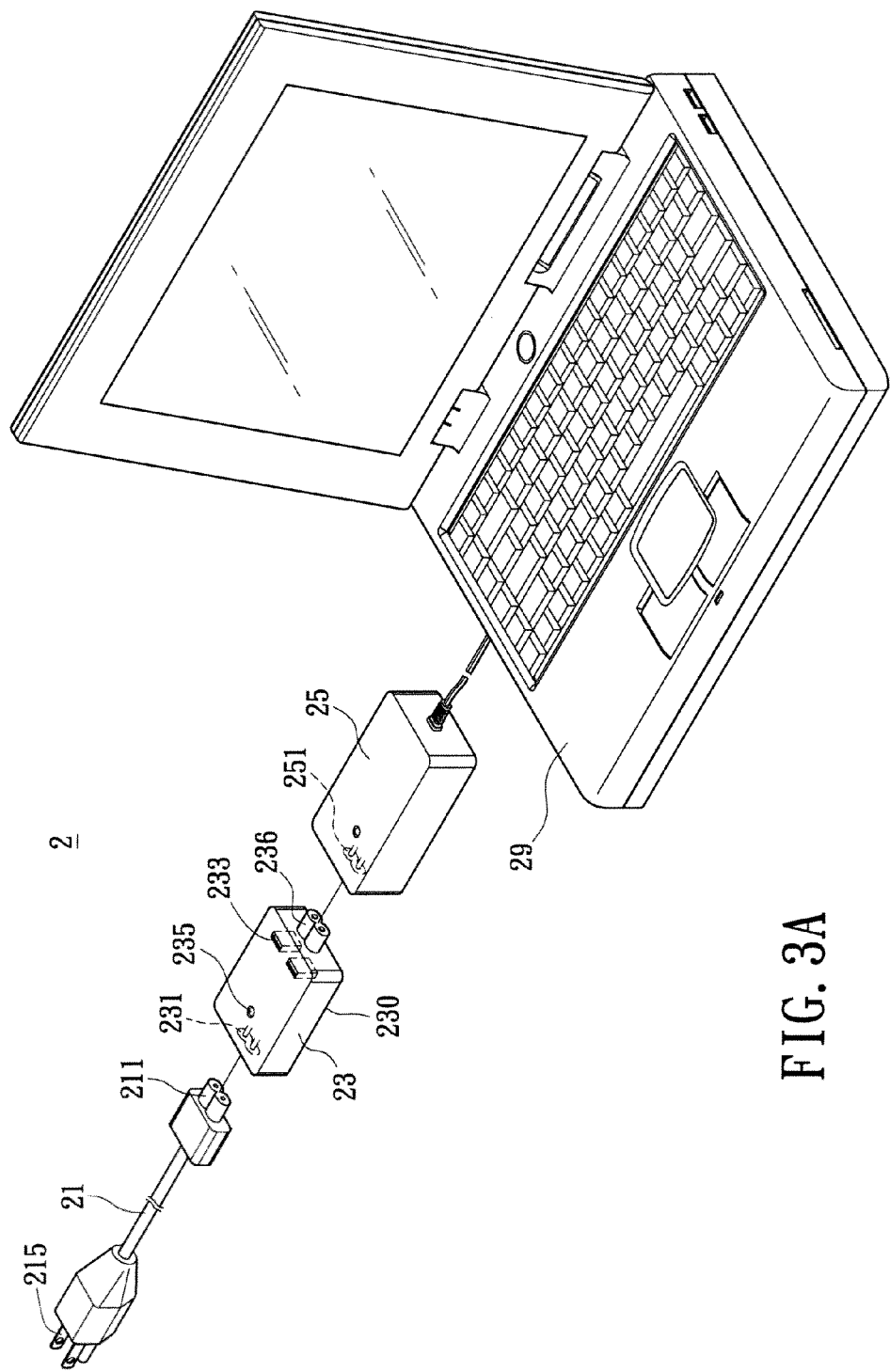
FIG. 3A shows a schematic view of an outlet assembly with a portable charger according to a third embodiment of the instant disclosure.
Figure 3B:
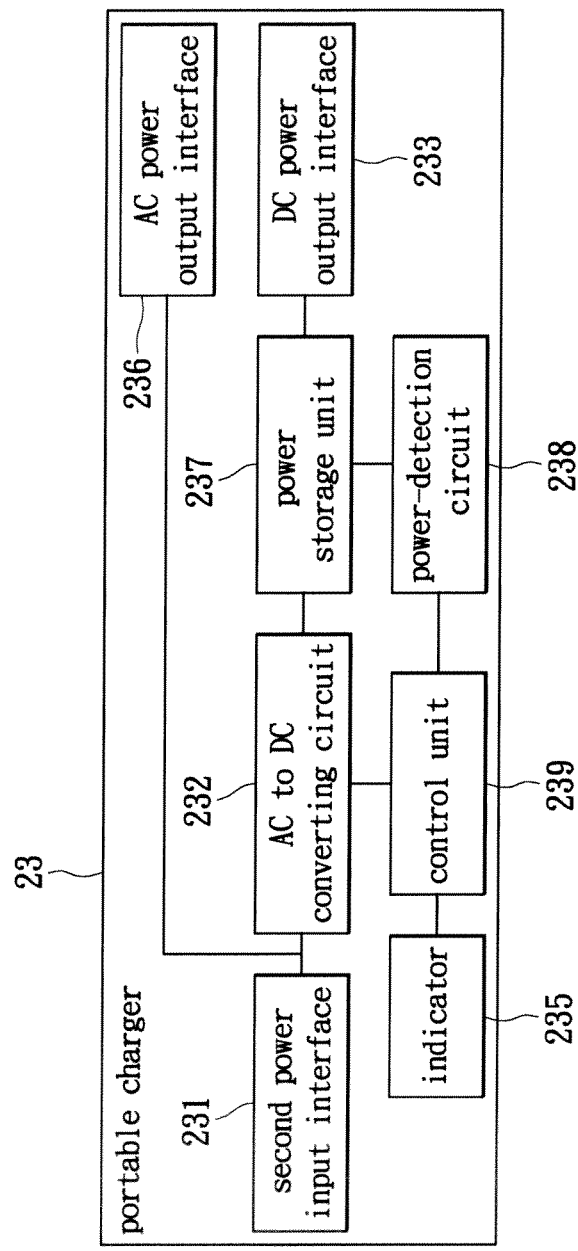
FIG. 3B shows a block diagram of an outlet assembly with a portable charger according to a third embodiment of the instant disclosure.

Finally, please refer to FIGS. 3A and 3B, which show a schematic view and a block diagram of an outlet assembly with a portable charger according to a third embodiment of the instant disclosure respectively. In the present embodiment, the portable charger 23 includes an AC power output interface 236 in addition to a DC power output interface 233. While the portable charger 23 is recharging, the portable charger 23 may provide the AC and the DC power.

As shown in FIG. 3A, the portable charger 23 may be utilized along with a power adapter 25 of a mobile electronic device 29, such as a laptop computer. The portable charger 23 has a casing 230. A second power input interface 231 is located on one end of the casing 230 with the AC power output interface 236 located at the other end of the casing 230. The second power input interface 231 is configured to fit with a first power output interface 211 of a power cord 21. The AC power output interface 236 is configured to fit to an AC power input interface 251 of the power adapter 25.

Next, please refer to FIGS. 3A and 3B. When the electronic device 29 is to receive the AC power, a first power input interface 215 of the power cord 21 is plugged to a wall socket or a power strip. The portable charger 23 receives the AC power by connecting the second power input interface 231 to the first power output interface 211 of the power cord 21. Thereafter, the AC power may be delivered to the electronic device 29. Simultaneously, the AC power is converted to the DC power for recharging the power storage unit 237. As the result, when the portable charger 23 is used independently the DC power may be outputed via the DC power output interface 233.

As shown in FIG. 3B, the second power input interface 231 is electrically connected to an AC to DC converting circuit 232 and the AC power output interface 236. The power storage unit 237 is electrically connected to the AC to DC converting circuit 232, the DC power output interface 233, and a power-detection circuit 238. A control unit 239 is electrically connected to the AC to DC converting circuit 232, the power-detection circuit 238, and an indicator 235. It is worth noting that the operations of the portable charger 23 are similar to those discussed supra.

The above discussions are for the outlet assembly with a portable charger of the instant disclosure. By incorporating a rechargeable battery inside the charger and utilizing the power input/output interfaces on the charger and the power strip, a portable charger may be recharged even when the electronic device connected to the portable charger is in use. In other words, the portable charger according to the instant disclosure occupies no additional socket of the power strip at the time of being recharged. Moreover, the portable charger according to the instant disclosure is capable of providing the AC power and the DC power.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. An outlet assembly with a portable charger, comprising:
a power strip, comprising:
a main body having a receiving portion;
a first power output interface deposited inside the receiving portion for supplying an alternating current (AC) power; and
a plurality of second power output interfaces located on the main body, the second power output interfaces are socket type; and
the portable charger, comprising:
a casing;
a second power input interface located on the casing for selectively connecting to the first power output interface;
an AC to direct current (DC) converting circuit located within the casing and electrically connected to the second power input interface for converting the AC power into a DC power;
a power storage unit located inside the casing and electrically connected to the AC to DC converting circuit, wherein the power storage unit is configured to store the DC power; and
a third power output interface located on the casing and electrically connected to the power storage unit for charging electronic devices;
wherein the receiving portion is shaped to firmly accommodate the portable charger, and when the second power input interface is electrically connected to the first power output interface, the portable charger is entirely accommodated within the receiving portion; and
wherein once the portable charger is detached from the power strip, the power storage unit is capable of receiving the DC power through the third power output interface.

2. The outlet assembly of claim 1, wherein the third power output interface is a universal serial bus (USB) port or a mini USB port.

3. The outlet assembly of claim 1, wherein the first power output interface and the second power input interface are connectors in compliance with international electro-technical commission (IEC) specifications.

4. The outlet assembly of claim 1, wherein the second power output interfaces selected from a group consisting of two-hole and three-hole sockets.

5. The outlet assembly of claim 1, wherein the portable charger further comprises an external AC power plug for being plugged to the second power output interface.

6. The outlet assembly of claim 5, wherein the external AC power plug is accommodated by the casing of the portable charger.

7. The outlet assembly of claim 1, wherein the portable charger further comprising:
a power-detection circuit located within the casing and electrically connected to the power storage unit, wherein the power-detection circuit detects a current, a voltage, and a power level of the power storage unit and transmits a detection signal;
an indicator located on the casing; and
a control unit located within the casing and electrically connected to the power-detection circuit and the indicator, wherein the control unit is configured to interpret the detection signal from the power-detection circuit and control the indicator to indicate the power level.

8. The outlet assembly of claim 7, wherein the control unit is electrically connected to the AC to DC converting circuit, wherein the control unit interprets the detection signal from the power-detection circuit before controlling whether the AC to DC converting circuit delivers an power output to the power storage unit.

9. An outlet assembly with a portable charger, comprising:
a power strip, comprising:
a main body having a receiving portion and a plurality of power socket;

a first power input interface located on the main body for receiving an alternating current (AC) power;

an AC to direct current (DC) converting circuit located within the main body and electrically connected to the first power input interface for converting the AC power to a DC power; and a first power output interface deposited inside the receiving portion and electrically connected to the AC to DC converting circuit for supplying the DC power; and the portable charger, comprising:
 a casing;
 a power transfer interface located on the casing for selectively connecting to the first power output interface;
 a power storage unit located within the casing; and
 a DC to DC converter located within the casing and electrically connected to the power transfer interface for delivering the DC power to the power storage unit and the DC power stored in the power storage unit to the power transfer interface;

wherein the receiving portion is shaped to firmly accommodate the portable charger, and when the power transfer interface is electrically connected to the first power output interface, the portable charger is entirely accommodated within the receiving portion;

wherein once the portable charger is detached from the power strip, the power storage unit is capable of releasing the DC power through the third power output interface.

10. The outlet assembly of claim 9, wherein the first output interface and the power transfer interface are selected from a group consisting of universal serial bus (USB) and mini USB connectors.

11. The outlet assembly with portable charger of claim 9, wherein the portable charger further comprises an external DC power connector having two power transfer interfaces that correspond to the power transfer interface of the portable charger.

12. An outlet assembly with a portable charger, comprising:
 a power strip, comprising:
  a main body having a receiving portion;
  a first power input interface located on the main body for receiving an alternating current (AC) power; and
  a first power output interface deposited inside the receiving portion for supplying the alternating current (AC) power;

a power adapter for an electronic device, having an alternating current (AC) power input interface; and the portable charger connected between the power adapter and the power strip, comprising:
a casing;
 a second power input interface located on the casing for selectively connecting to the first power output interface;
 an AC power output interface located on the casing for selectively connecting to the AC power input interface;
 an AC to direct current (DC) converting circuit located within the casing and electrically connected to the second power input interface for converting the AC power to a DC power;
 a power storage unit located within the casing and electrically connected to the AC to DC converting circuit, wherein the power storage unit is configured to store and release the DC power; and
 a DC power output interface located on the casing and electrically connected to the power storage unit for charging electronic devices;

wherein the receiving portion is shaped to firmly accommodate the portable charger, and when the second power input interface is electrically connected to the first power output interface, the portable charger is entirely accommodated within the receiving portion; and wherein once the portable charger is detached from the power strip, the power storage unit is capable of releasing the DC power through the third power output interface.

13. The outlet assembly with portable charger of claim 12, wherein the DC power output interface is selected from a group consisting of USB and mini USB connectors.

14. The outlet assembly with portable charger of claim 12, wherein the AC power output interface and the AC power input interface are connectors in compliance with international electro-technical commission (IEC) specifications and the second power input interface and the first power output interface are connectors in compliance with the IEC specifications.

* * * * *